(12) United States Patent
Rabitsch et al.

(10) Patent No.: US 7,591,271 B2
(45) Date of Patent: Sep. 22, 2009

(54) METHOD FOR REMOVAL OF FOULING AND/OR PLUGGING OUT OF A BUNDLE OF CHANNELS

(75) Inventors: Hermann Rabitsch, Vienna (AT); Krzysztof Krotla, Vienna (AT)

(73) Assignee: Envirgy Environment Energy Engineering and Construction GmbH, Vienna (AT)

( * ) Notice: Subject to any disclaimer, the term of this patent is extended or adjusted under 35 U.S.C. 154(b) by 520 days.

(21) Appl. No.: 11/207,746

(22) Filed: Aug. 22, 2005

(65) Prior Publication Data

US 2006/0060219 A1    Mar. 23, 2006

Related U.S. Application Data

(63) Continuation of application No. PCT/AT2004/000051, filed on Feb. 19, 2004.

(30) Foreign Application Priority Data

Feb. 21, 2003    (AT) ................................ A268/2003

(51) Int. Cl.
*B08B 9/027* (2006.01)

(52) U.S. Cl. ..................... 134/22.11; 134/22.12; 134/34
(58) Field of Classification Search ...................... None
See application file for complete search history.

(56) References Cited

U.S. PATENT DOCUMENTS 4,282,094 A * 8/1981 Mitchell ................ 210/167.28
6,387,836 B1    5/2002 Dorr et al.

FOREIGN PATENT DOCUMENTS

| JP | 07-144110 | 6/1995 |
|---|---|---|
| JP | 2001-232309 | 8/2001 |
| JP | 2002-045630 | 2/2002 |
| JP | 2002-166116 | 6/2002 |

* cited by examiner

*Primary Examiner*—Michael Kornakov
*Assistant Examiner*—Eric Golightly
(74) *Attorney, Agent, or Firm*—Dickstein Shapiro LLP

(57) ABSTRACT

Method for removal of fouling (14) and/or plugging (13) out of a bundle (11) of channels (12) by treatment with a liquid (2), in particular out of firmly interconnected channels (12), oriented in parallel to each other, as a catalyst module, which can be carried out very quickly and cost effectively, by filling the channels (12) repeatedly and alternately with the liquid (2) from their ends, and draining at least part of the filled in liquid off the same ends.

16 Claims, 4 Drawing Sheets

METHOD FOR REMOVAL OF FOULING AND/OR PLUGGING OUT OF A BUNDLE OF CHANNELS

This is a continuation of International Application No. PCT/AT2004/000051, filed Feb. 19, 2004.

The present invention relates to a method for the removal of fouling and/or plugging from a bundle of channels by means of treatment with a liquid in particular from firmly interconnected channels, oriented in parallel to each other and an apparatus for performing such method.

In the field of cleaning to keep something clean or the cleaning step itself of a number of parallel and especially interconnected channels are a certain problem. Such channels may stick together closely and may have shapes of the cross section as rectangular, honeycomb type, oval, round or others.

Interconnected channels are understood as a package like a heat exchanger bundle, catalyst for selective catalytic reduction, etc.

The present invention relates to a process for the regeneration of used deNOx or dedioxin catalysts. Such catalysts are used in so-called deNOx or dedioxin installations for reducing and breaking down nitrogen oxides and/or in particular halogenated dioxins and furans in flue gases or other exhaust and off-gases.

The process known as selective catalytic reduction, or SCR for short, is one of the possible options for lowering or even substantially lowering the levels of nitrogen oxides NOx, i.e. a mixture of NO and NO2, formed for example during the combustion of fossil fuels in combustion plants. In the SCR process, the nitrogen oxides are converted into nitrogen and water using ammonia or substances which form ammonia under the system conditions as reducing agent and using a catalyst. Since the catalytic reactions proceed on the surface of the catalyst, a large specific surface area has to be provided through the use of correspondingly porous materials for the reaction. This requirement is met by the use of homogeneous ceramic catalysts, for example in honeycomb form. Most of a catalyst of this nature consists, for example, of the base material titanium dioxide $TiO_2$ in which the active metal compounds, in particular $V_2O_5$, $WO_3$, are homogeneously distributed. However, the catalyst may also be applied as a coating to a support, for example a metal sheet. Under oxidizing conditions, identical or modified catalysts can also be used to lower the levels of emissions of organic products of incomplete combustion in off-gases from combustion plants, such as for example halogenated dioxins and furans. There are transport processes upstream and downstream of the chemical reactions which take place on the catalyst surface. Following adsorption of the reaction partners on the internal surface of the catalyst, chemical combination between the reaction participants and the catalyst leads to a lowering of the activation energy which is absolutely imperative for the reaction to commence. A consequence is that the reaction is accelerated or the equilibrium is established.

If these active centers are blocked, for example by the accumulation of alkali metals and alkaline earth metals or their compounds which are contained in the fly ash, so that the activated $NH_3$ adsorption required is partially impeded, the activity falls. In addition to this deterioration to the active areas of the catalyst surface through adsorbed catalyst toxins, the pores become blocked, for example, by calcium sulfate ($CaSO_4$) and ammonium hydrogen sulfate ($NH_4HSO_4$) which are formed. Since the catalyst cannot be 100% selective with respect to a specific reaction, the catalyst also promotes some secondary reactions, including the conversion of $SO_2$ to $SO_3$, in an order of magnitude which is relevant. Although this reaction can be minimized by the composition of the catalyst, the fact remains that the small amount of $SO_3$ is sufficient to react with the un-reacted $NH_3$, which is referred to as $NH_3$ slippage, and $H_2O$ to form various salts, primarily to form ammonium hydrogen sulfate and ammonium sulfate ($NH_4)_2SO_4$ or to combine with the fly ash.

These compounds form at temperatures at which condensation takes place when the temperature drops below the dew point of ammonium hydrogen sulfate. They may be deposited on the catalyst and in addition, together with adhesive particles, for example ash, fine dust, $SiO_2$, $Al_2O_3$, may block the pores and thus lower the activity of the catalysts.

Therefore, the nature of the composition of the compounds which may be deposited on the catalyst is dependent on the composition of the fly ash, of the flue gas and of the operating temperature. They are generally alkali metal and alkaline earth metal compounds which are contained in the fly ash as oxides and, on account of their reaction with $SO_3$, as sulfates and which are either deposited on the surface together with other compounds contained in the fly ash, such as for example $SiO_2$ and $Al_2O_3$, and block the pores, or, on account of their electron donor properties, block the active centers and thus prevent the activated $NH_3$ adsorption required.

The known methods for cleaning of such catalysts are afflicted with significant disadvantages. One has tried to clean the channels of the catalyst by spraying with pressurized water (e.g., JP 58030345 A, JP 59062329 A, JP 59066352 A). This is extremely time consuming and labor-intensive due to the narrow channels. Furthermore different mechanical cleaning methods have not been successful due to high costs affected by extensive time used.

In JP 58030345 A instead of water a mixture of water and pressurized gas is sprayed into the channels from one side. According JP 59049849 A the channels of the catalyst are cleaned form dust by first air blowing or sucking and secondly by filling the channels with water by putting the catalyst into a purge tank.

The object of the present invention is to provide a method and an apparatus for the subjected process combining minimizing labor work and material demand for the cleaning of the channels.

The object of the present invention is especially to increase the number of the active centers available for the catalysis is increased as far as possible or as desired, namely, for example, up to the activity of the fresh catalyst or even beyond, in order in this way for the catalytic converter, i.e., the catalyst, to be fully or partially regenerated.

Said method can be carried out in a particularly fast and inexpensive manner by repeatedly and alternately filling the channels with the liquid from the ends thereof, at least a portion of the filled liquid being drained via the same filling ends. By repeated filling and draining into/out of the channels results in a high cleaning efficiency due to gravity and momentum of the liquid. Repeated filling and draining from both directions has been proved as highly efficient for the cleaning.

For filling and draining the bundle of channels is brought into an angle to the horizontal position. This angle is preferably lower than 45°, preferentially lower than 20° and particularly lower than 10°.

Filling of the channels practically is done by immersion, by sprinkling, or by spraying respectively. A preferred liquid is water with ambient temperature or above with or without additives, which increase the cleaning capacity, e.g. surface active substances.

Draining of the channels practically is done by gravity. In addition pressure may be introduced.

The physical principle described above may be supported by other hydrodynamic effects as acoustic irradiation or an additional fluid circulation in the basin.

A notably beneficial embodiment is characterized by filling and draining of the channels is done by turning and/or rotating of the channels via an axis which is transversal to the channel direction and which is near the center of gravity of the bundle of channels, where the turning and/or rotating is done at a level of the liquid which is preferably near the level of the mentioned axis and where preferably the filling and draining of the channels will be performed with a frequency of 0.1 to 2 repetitions per minute. The level of the liquid may preferably be varied during the cleaning procedure.

An apparatus for performing the present method is characterized by a basin which is filled with a liquid at a defined and if necessary adjustable level, and a supporting device, which can be operated alternately, for holding the bundle of channels for immersion and emersion of it.

Appropriately the rinse cage is equipped with rinsing openings on two opposite sides so that the liquid can pass through and reach the end of the channels, and is equipped with devices for holding a bundle of channels, in particular clamping devices.

A particular beneficial design is characterized by the possibility to turn and/or rotate the rinse cage via an axis by means of an actuating device, where the axis of the rinsing cage is positioned near it's area of the center of gravity, which is about in the middle of the rinsing openings.

BRIEF DESCRIPTION OF THE DRAWINGS

In the following the invention based on an embodiment is described and shown in the drawing, where.

DETAILED DESCRIPTION OF THE INVENTION

Figure 1:
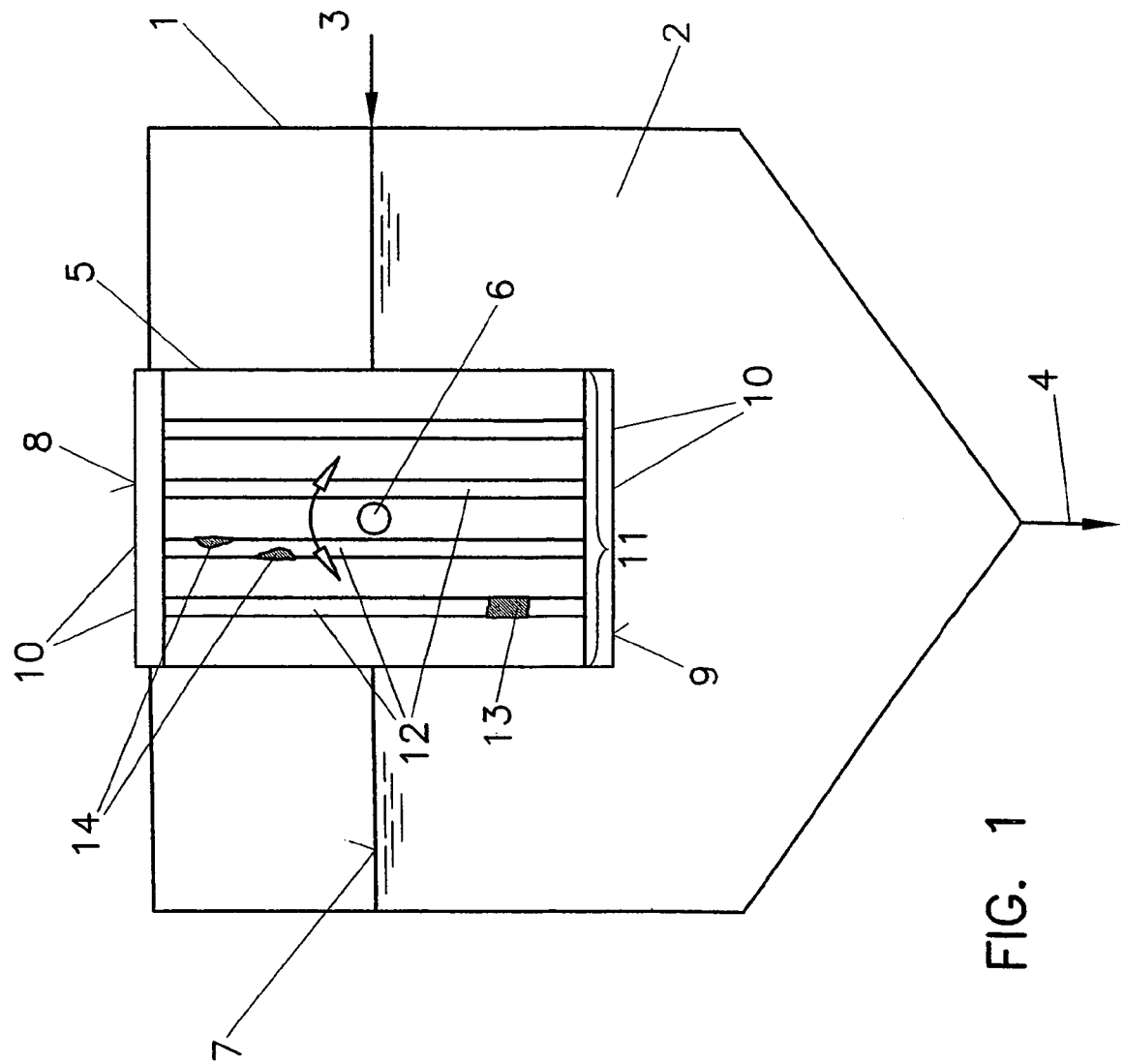
FIG. 1 shows the apparatus according to the present invention schematically in the initial position as a section.

A basin (1) containing a liquid (2) is equipped with a supply (3) and drain (4) for such liquid, where the drain (4) is designed on the deepest position of the basin (1) and is used also for disposal of appearing contaminants. The liquid (2) in the basin (1) may be fed to a not shown treatment center and afterwards may be fed again into the basin (1) via the supply (3).

In the basin (1) a supporting device (5), which is designed as rinse cage, is able to turn and able to rotate via an axis (6) near the area of the center of gravity. As drive an actuator is flanged to the axis. The basin is filled with the liquid (2) up to a level (7) which is near the height of the axis (6) of the rinse cage (5), where the level can be adjusted manually or by level control.

The rinse cage (5) comprises rinsing openings (10) on two opposite sides (8, 9) so that it can be filled with liquid (2) during immersion and can be drained during the upwards movement. The rinse cage (5) is filled with bundles (11) of channels (12), preferably with firmly interconnected channels oriented in parallel to each other, where one bundle (11)—or more than one bundle (11)—of firmly interconnected channels (12) parallel to each other are located in the rinse cage (5), where if a turning of the rinse cage (5) (see also FIG. 2 and FIG. 3) occurs the bundle will follow the movement and where the bundle is fixed to the rinse basin (5), e.g. by an holding or clamping device or in such a way that the bundle (11) or more bundles (11) do fit exactly and basically free of clearance into the rinse basin (5).

Figure 2:
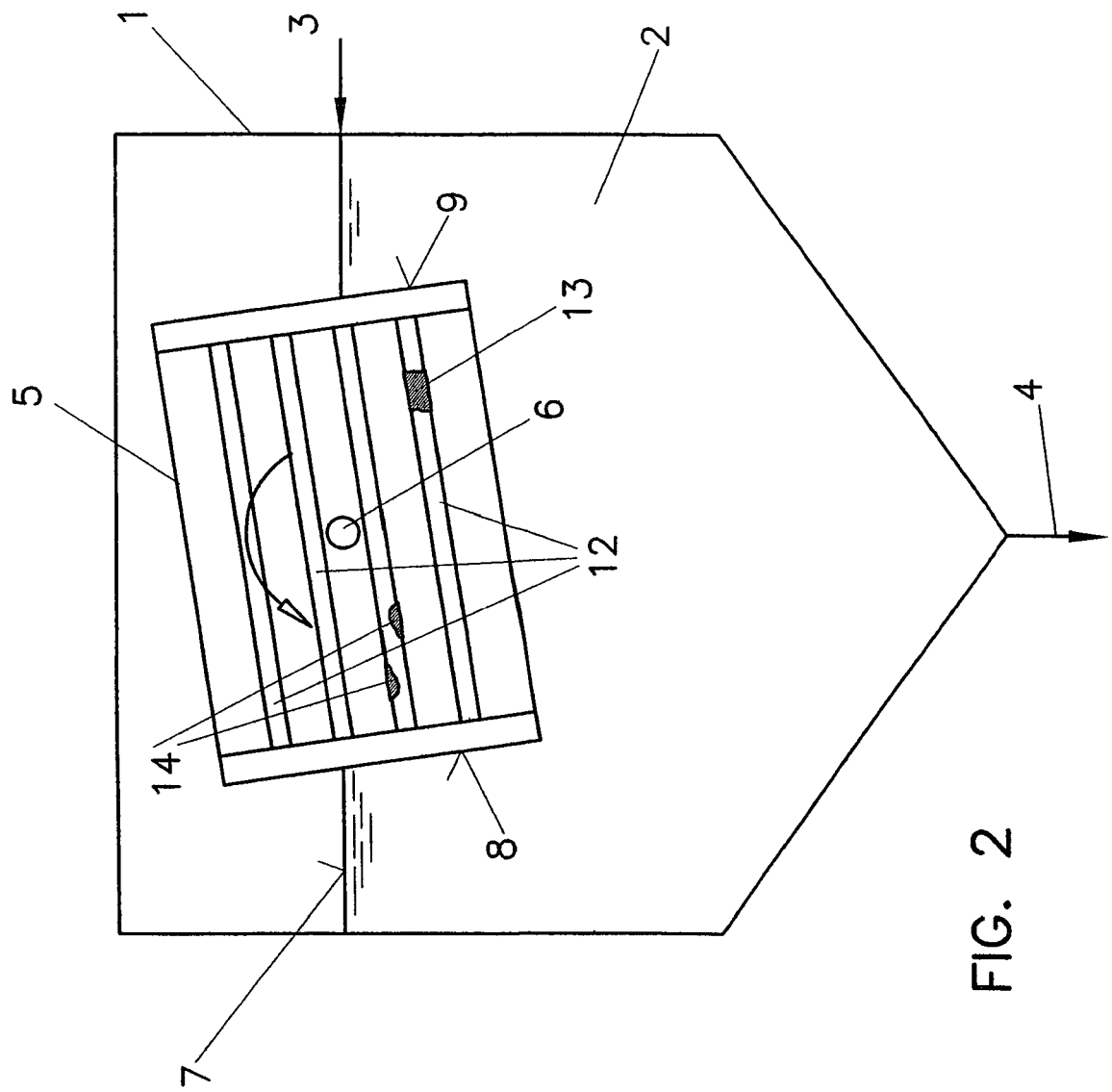
FIG. 2 and FIG. 3 show the apparatus in operation in different stages of the process.
Figure 3:
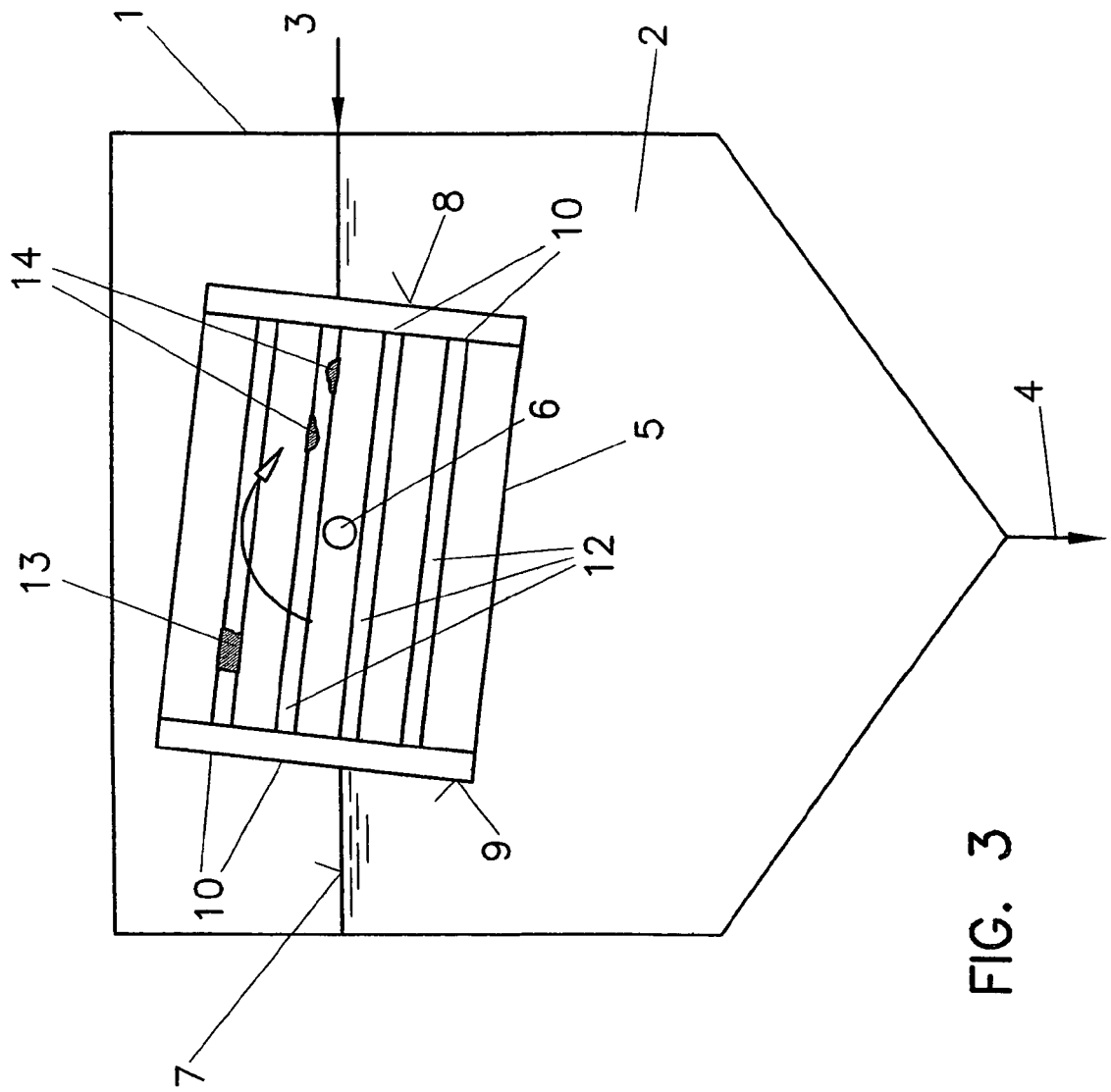

As can be seen from FIG. 1 schematically one of the channels (12) is plugged (13) and has fouling (14) also. If the rinse basin is turned as shown in FIG. 2 and FIG. 3 liquid (2) is entering the channels either from one side or after turning also from the other side towards the fouling, always from the open end of the channel (12). During the backwards movement the liquid (2) is draining from the channel (12) due to gravitation.

The actuator is designed variably in a wide range in respect of rotation velocity or frequency, respectively, preferably in the range of 0.1 to 2 repetitions per minute. Repeated immersion and draining of the channels (12) from both directions has been proved as highly efficient for the cleaning.

Alternatively filling of the channels is done by dousing, by sprinkling, or by spraying respectively. By that the motion of the rinse basin and thereby the channels is identically as described above but the rinse basin is not filled with the liquid. A combination with a certain degree of immersion of the rinse cage is of course possible.

The liquid (2) for cleaning may have different compositions referring to the actual type of contamination/fouling.

Figure 4:
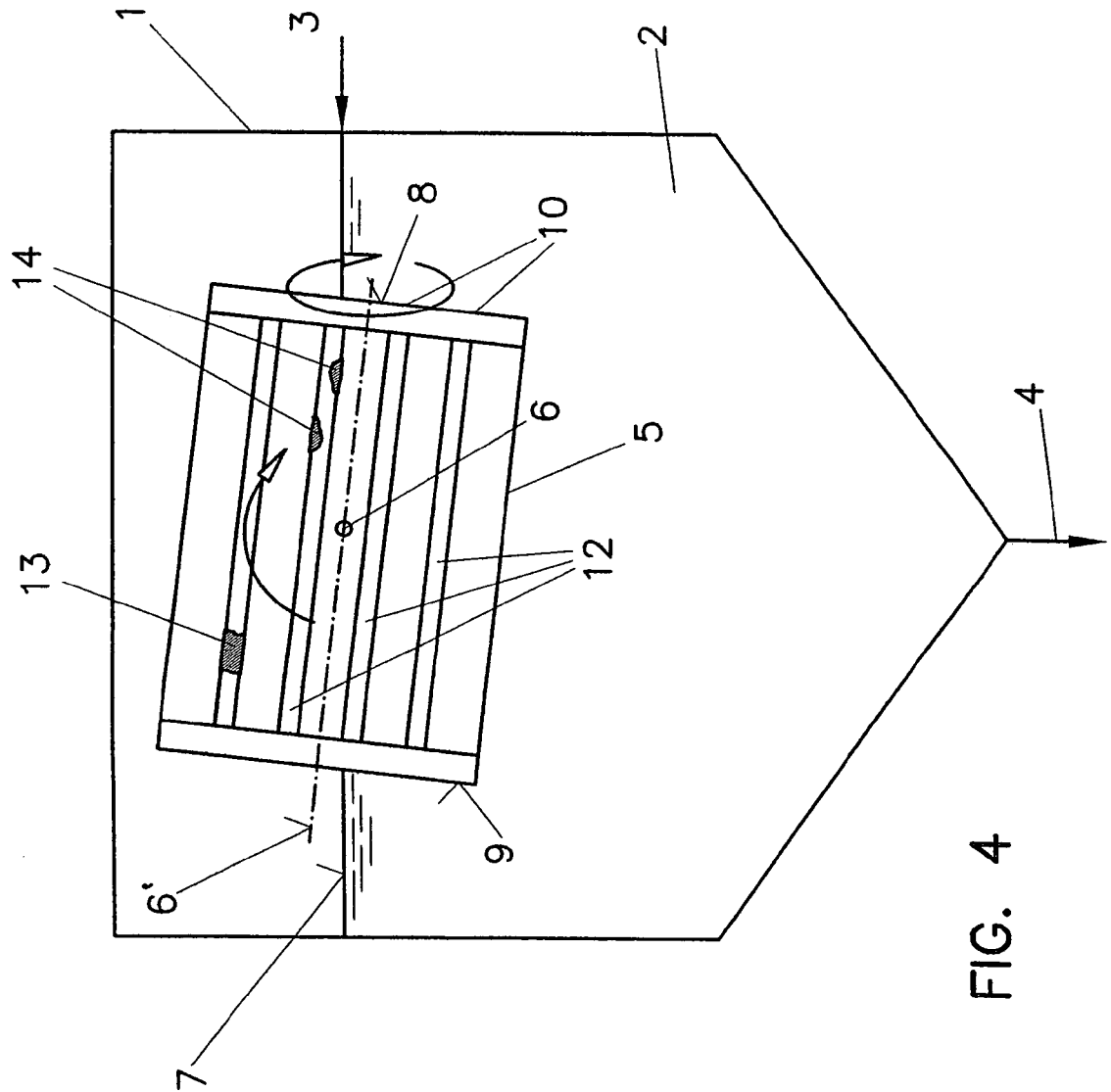
FIG. 4 shows a variant of the apparatus.

Immersion and draining occurs according to a variant shown in FIG. 4 by turning the channels (12) via an axis (6') which is parallel to the longitudinal direction of the channels (12) which is preferably near the area of the center of gravity of the bundle of channels, where the level of the liquid (2) is practically near the level of the rotation axis (6'). Thus in this case about one half of the channels (12) which are oriented horizontally may immerse into the liquid (2).

In order to ensure immersion and draining of the channels (12) the axis (6') is inclined to the horizontal position. The incline is preferably less than 45°, also less than 20°, in particular less than 10°. Furthermore the incline may be changed, e.g. after two to three turns, preferably after one turn, to the other side of the axis. In addition immersion and draining may preferably be performed in the range of 0.1 to 2 repetitions per minute. The level (7) of the liquid (2) may preferably be varied during the cleaning sequence.

The filling of the channel may be done alternatively by dousing, by sprinkling, or by spraying respectively. A combination with a certain level of filling of the rinse cage is certainly possible.

Washing in, for example, aqueous liquors is a complex operation in which numerous physical and chemical influences interact. This is understood as both the removal of water-soluble deposits (14) by water or by aqueous solutions of active washing substances and the detachment of water-insoluble deposits (14). In the process, it is possible to prevent re-deposition of the insoluble fractions which have already been detached, for example by acoustic irradiation or by stabilizing the dispersed fractions. The water serves as a solvent for washing agents and for soluble compounds and as a transport medium for the dispersed fractions. The washing operation is initiated by the wetting and penetration of the substrate.

The method according to the invention has shown high efficiency especially for catalysts and leads in any case to a substantial increase of catalyst activity of the cleaned catalyst compared to the un-cleaned catalyst.

Such treated catalyst can be re-installed again in the deNOx plant, dedioxin- and combined plants with the re-gained activity.

We claim:

1. A method for removal of at least one of fouling (14) and plugging (13) out of a bundle (11) of firmly interconnected channels (12) oriented in parallel to each other, each of said channels having a first opening at a first end and a second opening at a second end at opposite sides of the bundle, said channels extending entirely across the bundle, said method comprising:
- filling the channels repeatedly and alternately with liquid (2) through one of the first and second openings;
- rotating the bundle (11) around an axis (6) positioned transversal to the longitudinal direction of the channels (12); and
- draining at least part of the filled-in liquid through at least one of the first and second openings.

2. The method according to claim 1, which comprises positioning the bundle (11) of channels (12) for filling and for draining in a position inclined to the horizontal which is less than 45°.

3. The method according to claim 2, wherein the position inclined to the horizontal is less than 20°.

4. The method according to claim 3, wherein the position inclined to the horizontal is less than 10°.

5. The method according to claim 1, wherein filling the channels with the liquid comprises immersing at least one of said ends in a basin of said liquid.

6. The method according to claim 5, wherein immersing at least one of said ends comprises turning or rotating of the channels (12) via said axis (6) positioned transversal to the longitudinal direction of the channels (12).

7. The method according to claim 6, wherein the height of the level (7) of the liquid (2) corresponds approximately with the height of the axis (6).

8. The method according to claim 6, wherein the axis (6) is positioned near the area of the center of gravity of the bundle (11) of the channels (12).

9. The method according to claim 1, which comprises draining the channels (12) by means of gravity.

10. The method according to claim 1, wherein said rotation occurs at a speed sufficient to fill and drain the channels (12) at a frequency of 0.1 to 2 repetitions per minute.

11. The method according to claim 1, wherein the liquid is water with ambient temperature or above.

12. The method according to claim 11, wherein the water contains additives which increase the cleaning capacity.

13. The method according to claim 12, wherein the additives comprise surface active substances.

14. The method of claim 1, wherein rotating the bundle (11) via the axis (6) positioned transversal to the longitudinal direction of the channels (12) further comprises rotating the bundle in a clockwise direction.

15. The method of claim 1, wherein rotating the bundle (11) via the axis (6) positioned transversal to the longitudinal direction of the channels (12) further comprises rotating the bundle in a counterclockwise direction.

16. The method of claim 1, wherein rotating the bundle (11) via the axis (6) positioned transversal to the longitudinal direction of the channels (12) further comprises:
- rotating the bundle in a clockwise direction; and
- rotating the bundle in a counterclockwise direction.

* * * * *

UNITED STATES PATENT AND TRADEMARK OFFICE
CERTIFICATE OF CORRECTION

PATENT NO.       : 7,591,271 B2                                                Page 1 of 1
APPLICATION NO. : 11/207746
DATED            : September 22, 2009
INVENTOR(S)      : Rabitsch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this

Twenty-first Day of September, 2010

David J. Kappos
*Director of the United States Patent and Trademark Office*